US011157767B2

(12) United States Patent
Wang et al.

(10) Patent No.: US 11,157,767 B2
(45) Date of Patent: Oct. 26, 2021

(54) IMAGE SEARCHING METHOD BASED ON FEATURE EXTRACTION

(71) Applicant: Shanghai Firstbrave Information Technology Co., Ltd., Shanghai (CN)

(72) Inventors: Qingchuan Wang, Shanghai (CN); Guanyong Wu, Shanghai (CN); Feng Liu, Shanghai (CN); Xiangjun Zhu, Shanghai (CN)

(73) Assignee: Shanghai Firstbrave Information Technology Co., Ltd., Shanghai (CN)

( * ) Notice: Subject to any disclaimer, the term of this patent is extended or adjusted under 35 U.S.C. 154(b) by 115 days.

(21) Appl. No.: 16/691,755

(22) Filed: Nov. 22, 2019

(65) Prior Publication Data
US 2020/0202164 A1 Jun. 25, 2020

Related U.S. Application Data

(63) Continuation of application No. PCT/CN2017/000539, filed on Aug. 24, 2017.

(30) Foreign Application Priority Data

May 24, 2017 (CN) .......................... 201710375848.6

(51) Int. Cl.
*G06K 9/62* (2006.01)
*G06K 9/46* (2006.01)
(Continued)

(52) U.S. Cl.
CPC .......... *G06K 9/6215* (2013.01); *G06F 16/51* (2019.01); *G06F 16/53* (2019.01); *G06K 9/4647* (2013.01);
(Continued)

(58) Field of Classification Search
CPC .. G06K 9/6215; G06K 9/4647; G06K 9/4652; G06K 9/54; G06K 9/6212; G06F 16/53; G06F 16/51
See application file for complete search history.

(56) References Cited

U.S. PATENT DOCUMENTS

2011/0235902 A1* 9/2011 Chittar .................. G06F 16/532
382/162
2018/0228426 A1* 8/2018 Sinai ..................... G06K 9/4652

FOREIGN PATENT DOCUMENTS

CN 103473327 12/2013
CN 105718552 6/2016
(Continued)

OTHER PUBLICATIONS

International Search Report and Written Opinion for PCT/US2017/000539 (Chinese and English Translation).

*Primary Examiner* — David F Dunphy
(74) *Attorney, Agent, or Firm* — Yong Chen

(57) ABSTRACT

This invention provides an image searching method based on feature extraction to determine at least one sample image similar to the image to be searched, including the following steps: a. feature extraction on all sample images to obtain all corresponding feature information, while all sample images are $I_1, I_2, \ldots, I_S$ and all said feature information corresponding to all sample images are $V_1, V_2, \ldots, V_S$; b. creating an index tree based on all of said feature information; c. obtaining the feature information corresponding to the image to be searched based on the feature extraction; d. determining said feature information corresponding to at least one sample image having a minimum distance from the image to be searched based on the index tree and the feature information of the image to be searched. The invention has powerful functions and simple operation, and is able to avoid interference of background, text annotation and image
(Continued)

merging during processing and filtering of feature extraction, which has good search results and high commercial value.

15 Claims, 3 Drawing Sheets

(51) Int. Cl.
*G06K 9/54* (2006.01)
*G06F 16/51* (2019.01)
*G06F 16/53* (2019.01)

(52) U.S. Cl.
CPC .............. *G06K 9/4652* (2013.01); *G06K 9/54* (2013.01); *G06K 9/6212* (2013.01)

(56) References Cited

FOREIGN PATENT DOCUMENTS

| | | |
|---|---|---|
| WO | 2015123646 | 8/2015 |
| WO | 2017077076 | 5/2017 |

\* cited by examiner

IMAGE SEARCHING METHOD BASED ON FEATURE EXTRACTION

CROSS REFERENCE TO RELATED APPLICATIONS

This application is a continuation of International Application No. PCT/CN2017/000539 filed Aug. 24, 2017, which claims priority to Chinese Patent Application No. 201710375848.6 filed May 24, 2017, the disclosure of each of these prior filed applications is incorporated herein by reference in its entirety.

TECHNICAL FIELD

The invention belongs to the field of image searching, in particular, this is an image searching method based on feature extraction.

BACKGROUND ART

Commodity recommendation is one of the important applications of content-based image searching technology. In this application, the system performs feature extraction and indexing on tens of millions of commodity images (hereinafter referred to as "sample images"), and then with regard to the images given by the user (hereinafter referred to as "images to be searched"), after the process of feature extraction, searching in the sample image database and then returns similar sample images and related metadata information such as product ID, name, and purchase link and so on.

Commodity images usually contain a large part of the background that does not the product itself and there is also the text is added to the image or multiple images are combined into one image, which may cause serious interference to the extracted image features, thus affects the search accuracy and the effect of commodity recommendation.

Therefore, feature extraction method needs to be robust to the aforementioned background, word annotation, image merging and other factors, which means to achieve better search results by processing and filtering the aforementioned factors to avoid excessive influence on the image features. The existing literature records some researches on the robustness of image feature extraction, but it is mainly for simple geometric transformation such as image rotation and cropping, and feature extraction method suitable for commodity images and robust to the aforementioned factors has been seldom studied.

SUMMARY OF INVENTION

With respect of the defect of the existing technologies, the purpose of this invention is to provide an image searching method based on feature extraction to determine at least one sample image that is similar to the image to be searched, including the procedures as follows:

a. Performing the feature extraction step on all sample images to obtain all corresponding feature information, wherein all sample images are $I_1, I_2, \ldots, I_S$ (total number of which is S), and said feature information corresponding to all sample images are $V_1, V_2, \ldots, V_S$;

b. Creating an index tree based on all of said feature information;

c. Acquiring said feature information corresponding to the image to be searched based on the feature extraction step;

d. Searching the feature information corresponding to at least one sample image most closest thereto based on the index tree and the feature information corresponding to the image to be searched.

Preferably, the step a includes: a1. screening the sample images to obtain screening information corresponding to the sample images, including a outer frame range, an inner frame range of main image, and a screening result of each pixel; a2. performing the feature information calculation step on the sample images and its corresponding screening information.

Preferably, the step c includes: c1. performing a screening step on the images to be searched to obtain screening information corresponding to the sample images, including a main image outer frame range, a main image inner frame range, and a screening result of each pixel; c2. performing said feature information calculation step on the images to be searched and its corresponding screening information.

Preferably, before the feature extraction step, performing size compression step on the sample images and/or the images to be searched such that the width and height (in pixels) do not exceed a certain upper limit.

Preferably, the procedures of feature (information) calculation on the sample images or the images to be searched and the corresponding screening information are as follows:

1. Defining $m_f$ and $m_b$ as two real variables and assigning $m_f:=0$, $m_b:=0$; defining two real arrays $h_{val, f}$, $h_{val, b}$ representing the luminance histogram, and two real numbers array $h_{sat, f}$, $h_{sat, b}$ representing the saturation histogram, two real arrays $h_{hue, f}$, $h_{hue, b}$ representing the hue histogram, and assigning all of them an initial value of 0;

2. Performing the following steps for each pixel in the image that is within the outer frame of the main image:

ii. Calculating the background weight wb and foreground weight wf of the pixel point;

iii. Accumulating $w_f$ and $w_b$ to $m_f$ and $m_b$;

iv. Finding the screening result of the pixel, if the screening result is 1, terminating feature extraction step on such pixel;

v. Determining whether the red, green, and blue component values of the pixel (shall be real numbers between 0 and 1) are all 1, and if so, terminating feature extraction on such pixel; if any of the component values is not 1, continue with the step vi;

vi. Calculating the brightness value Val, the saturation value Sat, and the hue value Hue of the pixel respectively;

vii. Accumulating the brightness value Val, the saturation value Sat and the hue value Hue of the pixel to the luminance histogram array $h_{val, f}$, $h_{val, b}$, saturation histogram array $h_{sat, f}$, $h_{sat, b}$, hue histogram array $h_{hue, f}$, $h_{hue, b}$, according to the weights $w_f$, $w_b$.

3. After the completion of above pixel-by-pixel processing, normalizing and performing subtraction operations element by element the foreground luminance histogram $h_{val, f}$ and the background luminance histogram $h_{val, b}$ to obtain the luminance feature array $V_{val}$, normalizing and performing subtraction operations element by element the foreground saturation histogram $h_{sat, f}$ and the background saturation histogram $h_{sat, b}$ to obtain the saturation feature array $V_{sat}$, and normalizing and performing subtraction operations element by element the foreground hue histogram $h_{hue, f}$ and the background hue histogram $h_{hue, b}$ to obtain the hue feature array $V_{hue}$, and defining the real array variable in which $V_{val}$, $V_{sat}$, and $V_{hue}$ are combined into as said feature information.

Preferably, the step ii includes:

Setting the Y-axis coordinate value of the pixel to be i and the X-axis coordinate value to be j, then when the pixel is within the inner frame range of the main image ($i_1' \leq i \leq i_2'$, $j_1' \leq j \leq j_2'$), calculating the background weight $w_b$ and foreground weight $w_f$ according to the formulas:

$$w_b = (w_{b0})2, w_f = 1 - w_b, \text{ where}$$

$$w_{b0} = \min\left(\left|\frac{i}{\max(H-1,1)} - 0.5\right|, \left|\frac{i - i_{1'}}{\max(i_{2'} - i_1' - 1, 1)} - 0.5\right|\right) +$$

$$\min\left(\left|\frac{j}{\max(W-1,1)} - 0.5\right|,\right.$$

$$\left.\left|\frac{j - j_{1'}}{\max(j_{2'} - j_1' - 1, 1)} - 0.5\right|\right)\text{''}, i_1', i_2', j_1', j_2'$$

respectively correspond to the inner frame range of the main image in the image filtering information, H represents the height value of the image, W represents the width of the image; if not, set $w_b=1$, $w_f=0$.

Preferably, the step iii includes assigning values to $m_f$ and $m_b$: $m_f := m_f + w_f$, $m_b := m_b + w_b$.

Preferably, the step vi includes follows:
Calculating the pixel brightness value Val according to the formula:
Val=1−(0.299*Red+0.587*Green+0.114*Blue), where Red, Green, Blue represent the red, green, and blue component values, which are expressed as real numbers between 0 and 1;

Calculating saturation value Sat according to the formula "Sat=$\sqrt{Sat_2}$", $Sat_2 = Sat_1 * \min(Sat_1 * 8, 1)$, $Sat_1 = Sat_0 * \min(MaxRGB * 2, 1)$, $Sat_0 = MaxRGB - MinRGB$, where MaxRGB represents the maximum value of Red, Green, Blue, MinRGB represents minimum value of the Red, Green, Blue;

The hue value of the pixel point is calculated according to the following formula:

$$Hue = \begin{cases} 1 - \dfrac{Blue - MinRGB}{MaxRGB - MinRGB}, & \text{if } MaxRGB = Red, MinRGB = Green; \\ 1 + \dfrac{Green - MinRGB}{MaxRGB - MinRGB}, & \text{if } MaxRGB = Red, MinRGB = Blue; \\ 3 - \dfrac{Red - MinRGB}{MaxRGB - MinRGB}, & \text{if } MaxRGB = Green, MinRGB = Blue; \\ 3 + \dfrac{Blue - MinRGB}{MaxRGB - MinRGB}, & \text{if } MaxRGB = Green, MinRGB = Red; \\ 5 - \dfrac{Green - MinRGB}{MaxRGB - MinRGB}, & \text{if } MaxRGB = Blue, MinRGB = Red; \\ 5 + \dfrac{Red - MinRGB}{MaxRGB - MinRGB}, & \text{if } MaxRGB = Blue > Red, MinRGB = Green. \end{cases}$$

Preferably, the step vii includes follows:
Setting $h_{val,f}$ and $h_{val,b}$ each contain $N_{val}$ elements, $h_{sat,f}$ and $h_{sat,b}$ each contain $N_{sat}$ elements, $h_{hue,f}$ and $h_{hue,b}$ each contain $N_{hue}$ elements;

Setting $(N_{val}-1)*Val=u+v$ (u is an integer between 0 and $N_{val}-2$, v is a real number between 0 and 1), then assigning values according to the formulas:

$$h_{val,f}[u] := h_{val,f}[u] + (1-v) * w_f, h_{val,f}[u+1] := h_{val,f}[u+1] + v * w_f;$$

$$h_{val,b}[u] := h_{val,b}[u] + (1-v) * w_b, h_{val,b}[u+1] := h_{val,b}[u+1] + v * w_b;$$

Setting $(N_{sat}-1)*Sat=u+v$ (u is an integer between 0 and $N_{sat}-2$, v is a real number between 0 and 1), then assigning values according to the formulas;

$$h_{sat,f}[u] := h_{sat,f}[u] + (1-v) * w_f, h_{sat,f}[u+1] := h_{sat,f}[u+1] + v * w_f;$$

$$h_{sat,b}[u] := h_{sat,b}[u] + (1-v) * w_b, h_{sat,b}[u+1] := h_{sat,b}[u+1] + v * w_b;$$

Setting $(N_{hue}/6)*Hue=u+v$ (u is an integer between 0 and $N_{hue}-1$, v is a real number between 0 and 1) and $u^+ = (u+1) \bmod N_{hue}$ (i.e. remainder from dividing $(u+1)$ by $N_{hue}$), then assigning values according to the formulas:

$$h_{hue,f}[u] := h_{hue,f}[u] + (1-v) * Sat * w_f, h_{hue,f}[u^+] := h_{hue,f}[u^+] + v * Sat * w_f;$$

$$h_{hue,b}[u] := h_{hue,b}[u] + (1-v) * Sat * w_b, h_{hue,b}[u^+] := h_{hue,b}[u^+] + v * Sat * w_b.$$

Preferably, the step 3 includes follows:

$$V_{val}[u] = \max(h_{val,f}[u]/m_f - h_{val,b}[u]/m_b, 0), u=0, \ldots, N_{val}-1;$$

$$V_{sat}[u] = \max(h_{sat,f}[u]/m_f - h_{sat,b}[u]/m_b, 0), u=0, \ldots, N_{sat}-1;$$

$$V_{hue}[u] = \max(h_{hue,f}[u]/m_f - h_{hue,b}[u]/m_b, 0), u=0, \ldots, N_{hue}-1.$$

Preferably, the index tree is a k-d tree and the step includes follows:

In the k-d tree which is the index tree containing the feature information $V_1, \ldots, V_S$ corresponding to all sample images, searching feature information of one or more sample image which has or have the least square Euclidean distance $$dist(V_s, V_0) = \sum_{k=0}^{N_{feat}-1} (V_s[k] - V_0[k])^2$$

from the feature information of the image to be searched ($V_0$) corresponding to the image to be searched, among which $N_{feat} = N_{val} + N_{sat} + N_{hue}$ represents the total number of elements in the feature array for each image.

The invention adopts the features of the color histogram since commodity images have variable shooting angles as well as rich and different shades of colors. Meanwhile, in order to reduce the interference of the background, the invention calculates the histograms of the background and the foreground part respectively, and after subtraction, the result will be used as a feature. The invention searches such feature information in the index tree to obtain the similar image corresponding to feature information. The invention has powerful functions, fast calculation and simple operation, and is able to avoid interference of background, text annotation and image merging during processing and filtering of feature extraction, which has high commercial value.

BRIEF DESCRIPTION OF DRAWINGS

By reading and referring to the detailed descriptions of the non-limiting embodiments described by the following figures, the other features, objectives and advantages of the invention will be more apparent.

DETAILED EMBODIMENT

Figure 1:
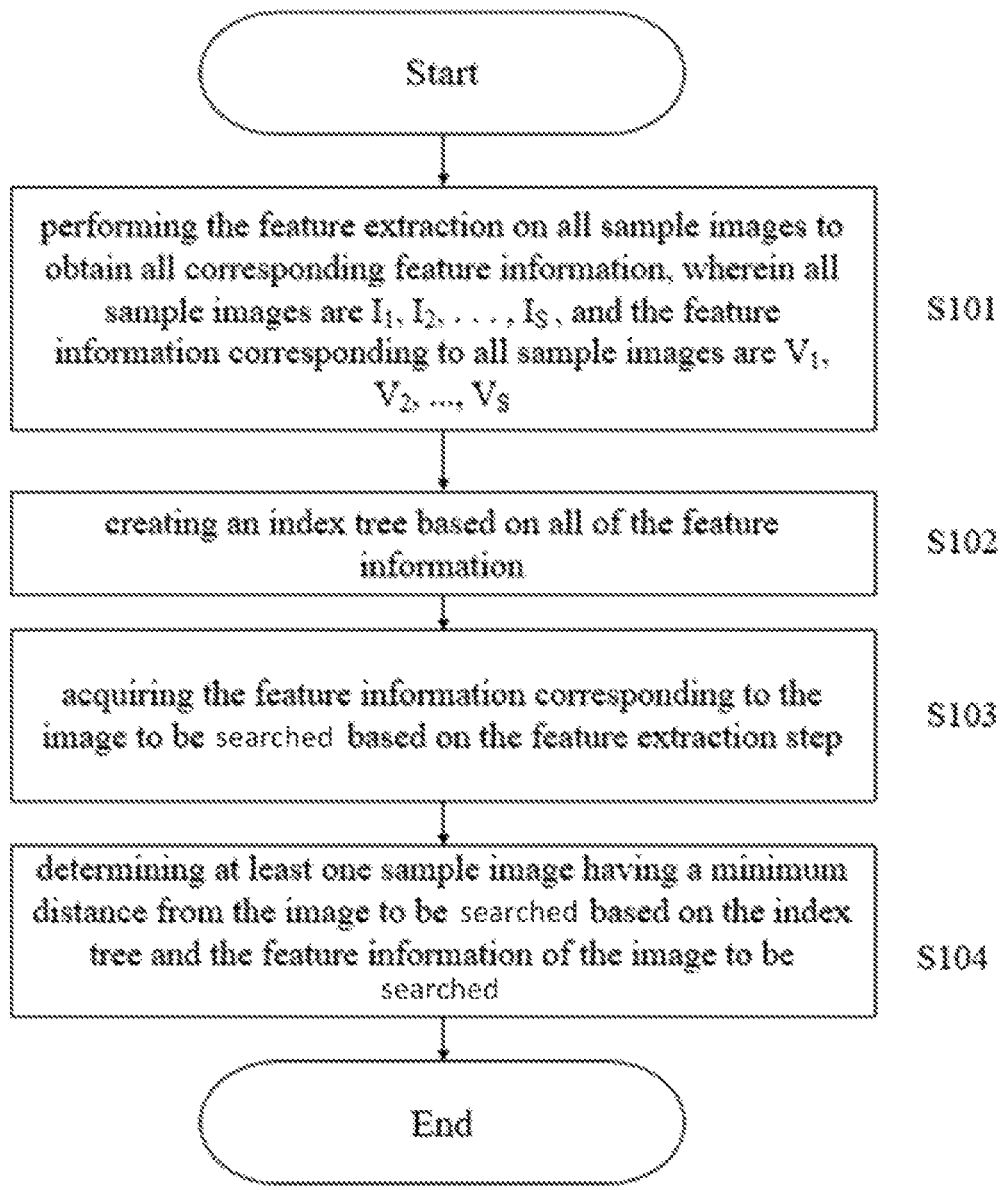
FIG. 1 is shown as a process schematic diagram of an image searching method based on feature extraction, showing the detailed implementation of the invention.

In order to make the purpose, technical scheme and advantages of the invention clearer, the technical scheme of the invention is described below in combination with the drawings. FIG. 1 is shown as a process schematic diagram of an image searching method based on feature extraction, showing the detailed implementation of the invention. Specifically, FIG. 1 is used for determining at least one sample image similar to the image to be searched, that is, by extracting feature information corresponding to each image from all sample images, and searching for all feature information of sample images corresponding to the image to be searched based on said feature information of said image to be searched, thereby obtaining the commodity images similar to the sample image. Specifically, as follows, Firstly, step S101, performing feature extraction on all sample images to obtain all corresponding feature information, wherein all sample images are $I_1, I_2, \ldots, I_S$, and the feature information corresponding to all sample images are $V_1, V_2, \ldots, V_S$; S represents the number of all sample images in these embodiments for there are a lot of sample images.

The feature information of each image is small quantities of information generated based on the image content that can be used for similar image searching. Further, feature information is preferably an array contains $N_{feat}=21$ (among which $N_{val}=5$, $N_{sat}=4$, $N_{hue}=12$) real number. It is understood by those skilled in the art that the detailed steps of performing feature extraction on all the sample images to obtain all the corresponding feature information will be further described in the detailed embodiments later, and will not be described herein.

Then, step S102, creating index tree based on all the feature information. Further, after step S101, all the feature information corresponding to all sample images are obtained as $V_1, V_2, \ldots, V_S$. Then create k-d tree containing all the feature information corresponding to all sample images ($V_1, V_2, \ldots, V_S$) and call it "index of sample feature". K-d tree (short for k-dimensional tree) is a data structure that organizes points in the Euclidean space in the k dimension (if the feature information is an array containing 21 real Numbers as described above, then k=21). In computer science, k-d trees can be used in a variety of applications, such as multidimensional key-value search. K-d tree is a special case of the binary tree, that is, the k-d tree is a binary tree in which each node is a k-dimensional point. It is understood by those skilled in the art that the establishment of the k-d tree adopts an industry-accepted algorithm which belongs to the current available technical solutions, and will not be described herein.

After finishing the above steps in one time, perform steps S103 and S104 for each image to be searched submitted by the user. In step S103, the feature information corresponding to the image to be searched is acquired based on the feature extraction. It is understood by those skilled in the art that the step of acquiring the feature information corresponding to the image to be searched is the same as the step of extracting the feature information of obtaining all the sample images in step S101, which will be described in the mode of implementation hereafter.

In step S104, determining said feature information corresponding to at least one sample image having a minimum distance from the image to be searched based on the index tree and said feature information of said image to be searched. It is understood by those skilled in the art that step S104, which is to determine said feature information corresponding to at least one sample image closest to said image to be searched based on the index tree and the feature information of said image to be searched. It will define the square Euclidean distance between feature information $V_s$ corresponding to each sample image $I_s$ and feature information $V_o$ corresponding to the image to be searched based on the formula $$"dist(V_s, V_0) = \sum_{k=0}^{N_{feat}-1} (V_s[k] - V_0[k])^2",$$

and use the search algorithm of k-d tree to query the subscript "s" of one or more sample image(s) that minimize the square Euclidean distance and return the corresponding image (with the associated item ID, name, purchase link, and other metadata information in a preferable embodiment) to the user as the search result. Calculating and searching square Euclidean distance according to formulas will adopt an industry-accepted algorithm which can be achieved by the technical engineer of such fields following description of this invention, and will not be described herein.

Figure 2:
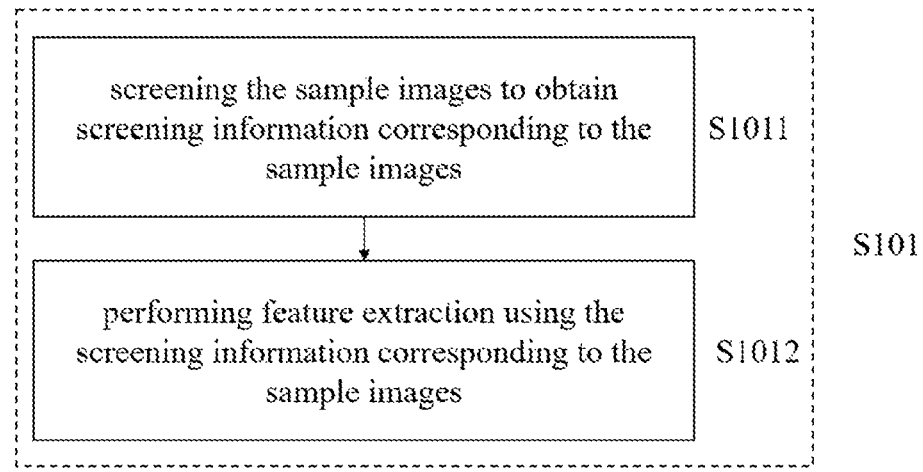
FIG. 2 is shown as a process schematic diagram of feature extraction on all sample images to obtain all corresponding feature information via the image searching method based on feature extraction, according to the first embodiment of the invention.

FIG. 2 is shown as a process schematic diagram, in the first embodiment of the invention, of feature extraction on all sample images to obtain all corresponding feature information via the image searching method based on feature extraction. In step S101, screening on the sample image to obtain screening information corresponding to the sample image, and performing feature extraction step using said screening information corresponding to the sample image. The screening information of each image includes the coordinate range of two rectangular areas, which is referred to as the outer frame of main image and the inner frame of main image respectively, wherein the inner frame is a sub-area of the outer frame, and the screening result of each pixel point, wherein "1" indicates that the pixel is screened out, and "0" indicates that the pixel is retained. It is understood by those skilled in the art that there is a sample image in the sample image database corresponding to each $s=1, \ldots, S$, and we shall screen each sample image. Further, for each sample image I (or image to be searched), defining its width as W, its height as H (W,H$>=$1), and the pixels of row j and column i as I[I,j] (i=0, \ldots, H−1, j=0, \ldots, W−1). Each pixel I[i,j] contains three components which are red, green and blue (expressed as real numbers between 0 and 1). It is understood by those skilled in the art that red, green, and blue components of each pixel in the actual image are usually represented as integers between 0 and 255 and in these embodiments can the original value of each component be divided by 255 to be a real number between 0 and 1.

Figure 3:
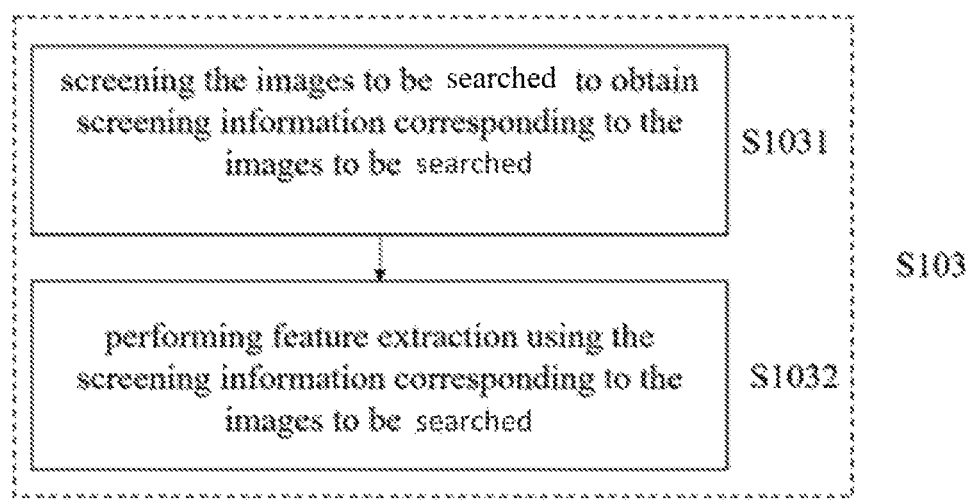
FIG. 3 is shown as a process schematic diagram of obtaining the corresponding feature information of images to be searched feature based on feature extraction via the image searching method based on feature extraction, according to the second embodiment of the invention.

Accordingly, FIG. 3 is shown as a process schematic diagram, in the second embodiment of the invention, of obtaining the corresponding feature information of images to be searched feature based on feature extraction via the image searching method based on feature extraction.

In step S103, performing a screening step on the images to be searched to obtain screening information corresponding to the sample images and performing the feature extraction step using the screening information of the images to be searched, which will be further described in the detailed embodiments below, and will not be described herein Further, before the feature extraction step, performing size compression step on the sample images and the images to be searched. In these embodiments, to speed up the subsequent processing, if the width or height of the sample image exceeds 220 pixels, it will be scaled down to the width or height whichever bigger becomes 220 pixels with the same ratio of width to height; if the width or height of the searched image exceeds 220 pixels, it will be scaled down to the width or height whichever bigger becomes 220 pixels with the same ratio of width to height; After scaling down, image and its width and height are still referred to as I, W, H.

Figure 4:
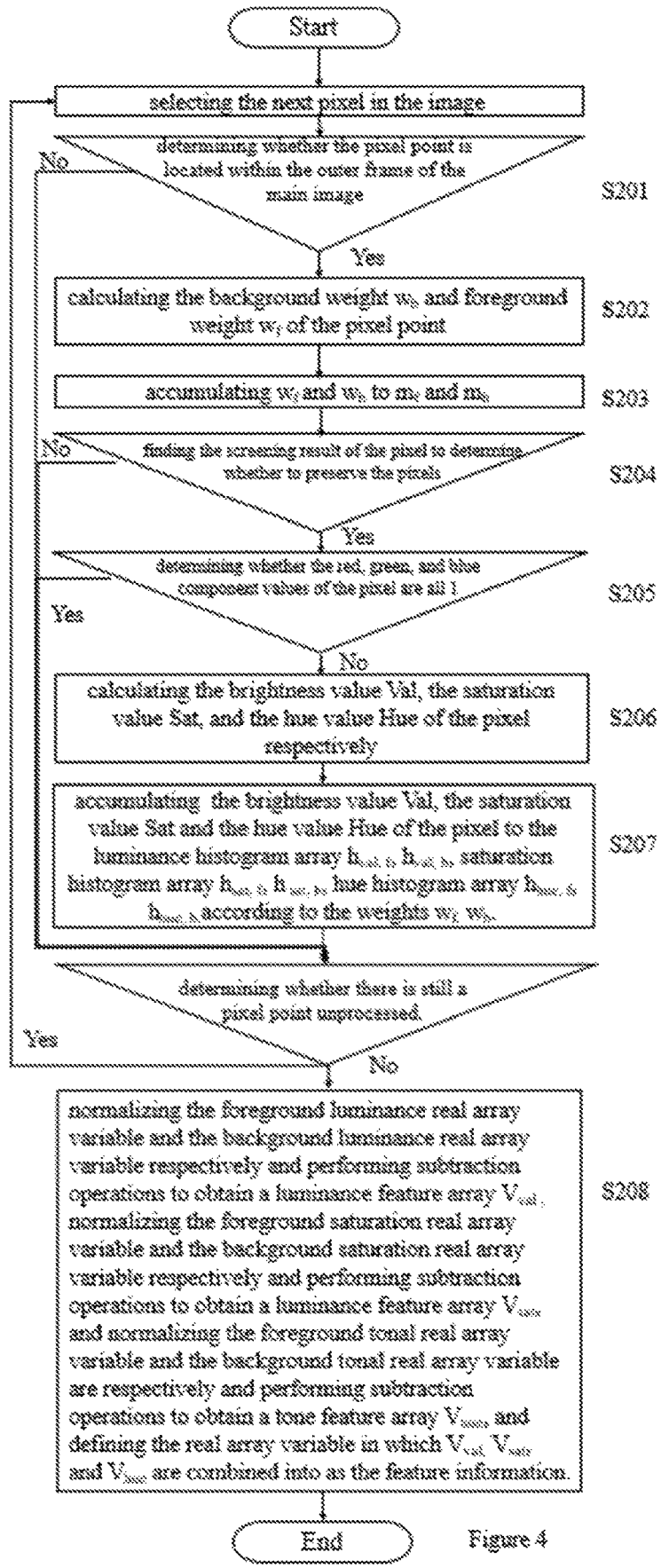
FIG. 4 is shown as a process schematic diagram of performing feature extraction on pixels of the sample images or images to be searched via the image searching method based on feature extraction, according to the third embodiment of the invention.

FIG. 4 is shown as a process schematic diagram, in the third embodiment of the invention, of performing feature extraction on pixels of the sample images or images to be searched via the image searching method based on feature extraction. The step is processing the pixel one by one to implement feature extraction for each image, specifically, contains the following steps:

With respect to each pixel, we will keep selecting the next pixel in the image before step S201 is carried out, so there is a continuing cycle between steps S201 and S207 until no pixel can be selected in the image. In the process of steps S201 to S207, the steps may be terminated in advance and proceed to the next pixel point in accordance with the result of continuous judgment process, which will be further described in the detailed embodiments later.

Firstly, step S201, which is a determination process, is to determine whether the pixel point is located within the outer frame of the main image. If the pixel is located in the outer frame of the main image, proceed to step S202; if the pixel is beyond the outer frame of the main image, no subsequent processing will be performed on this pixel, and the next pixel will be processed from step S201.

After step S201, step S202 is processed to calculate the background weight $w_b$ and the foreground weight $w_f$ of the pixel point. It is understood by those skilled in the art that, in order to reduce the interference of the background, the invention calculates the histograms (including the histograms of brightness, saturation, hue) of the background and the foreground part respectively, use the result of subtraction as a feature in step S208.

In particular, if the pixel locates within the inner frame range of the main image, calculating the background weight $w_b$ and foreground weight $w_f$ according to the formulas:

$$w_b = (w_{b0})^2, w_f = 1 - w_b, \text{ where}$$

$$w_{b0} = \min\left(\left|\frac{i}{\max(H-1,1)} - 0.5\right|, \left|\frac{i - i_1'}{\max(i_{2'} - i_1' - 1, 1)} - 0.5\right|\right) +$$

$$\min\left(\left|\frac{j}{\max(W-1,1)} - 0.5\right|, \left|\frac{j - j_1'}{\max(j_{2'} - j_1' - 1, 1)} - 0.5\right|\right),$$

where $i_1', i_2'$ represent the two end point in the Y-axis of the main frame of the image;

$j_1', j_2'$ represent the two endpoint in the X-axis of the main frame of the image;

H represents the height of the image;

W represents the width of the image;

i,j represent the value of each y-axis and x-axis coordinate of the pixel point.

If the pixel is beyond the inner frame range of the main image, then $w_b = 1$, $w_f = 0$. $w_b$ is between 0 and 1, close to 0 means the pixel is in the foreground (commodity) part, and close to 1 means the pixel is in the background part. Intuitively, the above formula will treat the part close to the overall center of the image and the central part of the inner frame range of the main image as foreground.

And then, in step S203, set $m_f$ and $m_b$ as two real variables with initial values of 0, and assign $m_f := w_f$, $m_b := m_b + w_b$ to this pixel.

And further, step S204 is to find the screening result of the pixel in the screening information of the sample image/image to be searched, if the screening result shows that the pixel is reserved, proceeding to step S205; if the screening result shows that the pixel is screened out, the pixel is not subjected to subsequent processing, and the next pixel will be processed from S201. In the screening results, the text, added framework and other parts made by human on the image will be screened out as much as possible to avoid affecting the extracted feature information. And further, step S205 is to determine whether the red, green, and blue components of the pixel are all 1. If so, i.e., the pixel is pure white, the pixel is not subjected to subsequent processing, and the next pixel will be processed from S201; if any of the red, green, and blue components of the pixel is not 1, i.e. the pixel is not pure white, step S206 below is to be continued.

Step S206 is to calculate the brightness value Val, the saturation value Sat, and the hue value Hue of the pixel respectively. In these embodiments, calculating the pixel brightness value Val according to the formula:

Val=1−(0.299*Red+0.587*Green+0.114*Blue),
where

Red, Green, Blue represent the red, green, and blue component values, which is expressed as real numbers between 0 and 1.

For the background of most of images in the gallery is white, "Val=0" represents white, "Val=1" represents black.

In said step S207, set $h_{val,f}$ and $h_{val,b}$ as foreground brightness real array variable and background brightness real array variable containing $N_{val}$ elements respectively; set $h_{sat,f}$ and $h_{sat,b}$ as foreground saturation real array variable and background saturation real array variable containing $N_{sat}$ elements respectively; set $h_{hue,f}$ and $h_{hue,b}$ as foreground hue real array variable and background hue real array variable containing $N_{hue}$ elements respectively; the initial value of all elements is 0;

and, set $(N_{val}-1)*Val = u + v$, where u is an integer between 0 and $N_{val}-2$, and v is a real number between 0 and 1, then assigning values according to the formulas:

$h_{val,f}[u]:=h_{val,f}[u]+(1-v)*w_f, h_{val,f}[u+1]:=h_{val,f}[u+1]+v*w_f;$ $h_{val,b}[u]:=h_{val,b}[u]+(1-v)*w_b, h_{val,b}[u+1]:=h_{val,b}[u+1]+v*w_b;$ and set$(N_{sat}-1)*Sat=u+v$, where u is an integer between 0 and $N_{sat}-2$, and v is a real number between 0 and 1, then assigning values according to the formulas:

$h_{sat,f}[u]:=h_{sat,f}[u]+(1-v)*w_f, h_{sat,f}[u+1]:=h_{sat,f}[u+1]+v*w_f;$ $h_{sat,b}[u]:=h_{sat,b}[u]+(1-v)*w_b, h_{sat,b}[u+1]:=h_{sat,b}[u+1]+v*w_b;$ and set$(N_{hue}/6)*Hue=u+v$, where u is an integer between 0 and $N_{hue}-1$, and v is a real number between 0 and 1, and set $u^+=(u+1) \bmod N_{hue}$, then assigning values according to the formulas:

$h_{hue,f}[u]:=h_{hue,f}[u]+(1-v)*Sat*w_f, h_{hue,f}[u^+]:=h_{hue,f}[u^+]+v*Sat*w_f;$ $h_{hue,b}[u]:=h_{hue,b}[u]+(1-v)*Sat*w_b, h_{hue,b}[u^+]:=h_{hue,b}[u^+]+v*Sat*w_b.$ Calculating saturation value Sat according to the formula:

$Sat=\sqrt{Sat_2}$, where $Sat_2=Sat_1*\min(Sat_1*8, 1),$
$Sat_1=Sat_0*\min(MaxRGB*2,1),$
$Sat_0=MaxRGB-MinRGB$, where MaxRGB represents the maximum value of Red, Green, Blue, MinRGB represents minimum value of the Red, Green, Blue.

Besides, $Sat_0$ can be regarded as the original saturation of pixels and the modification of $Sat_1$ reduces the saturation of dark colors to make them more intuitive, the modification of $Sat_2$ reduces the interference of pixels with extremely low saturation, for it is usually just a phenomenon of incorrect white balance and does not mean that it is actually colored. The hue value of the pixel point is calculated according to the following formula:

$$Hue = \begin{cases} 1 - \frac{Blue - MinRGB}{MaxRGB - MinRGB}, & \text{if } MaxRGB = Red, MinRGB = Green; \\ 1 + \frac{Green - MinRGB}{MaxRGB - MinRGB}, & \text{if } MaxRGB = Red, MinRGB = Blue; \\ 3 - \frac{Red - MinRGB}{MaxRGB - MinRGB}, & \text{if } MaxRGB = Green, MinRGB = Blue; \\ 3 + \frac{Blue - MinRGB}{MaxRGB - MinRGB}, & \text{if } MaxRGB = Green, MinRGB = Red; \\ 5 - \frac{Green - MinRGB}{MaxRGB - MinRGB}, & \text{if } MaxRGB = Blue, MinRGB = Red; \\ 5 + \frac{Red - MinRGB}{MaxRGB - MinRGB}, & \text{if } MaxRGB = Blue > Red, MinRGB = Green. \end{cases}$$

It is understood by those skilled in the art that according to the above formula, even when Red, Green, and Blue are not completely different, a unique Hue value can be obtained and fall within the scope of 0<=Hue<6. In a particular embodiment, if MaxRGB=MinRGB, then Hue=0. In such an embodiment, since Sat=0 at this time, the value of Hue has no effect on step S207.

Thus, until now the processing of the pixel points is completed. Further, determining whether there is still a pixel point unprocessed. If so, such pixel point should be processed from step S201; if not, the process proceeds to step S208.

After performing steps S201-S207 for all the pixels, step S208 is to normalize the foreground luminance real array variable and the background luminance real array variable respectively and perform subtraction operations to obtain a luminance feature array $V_{val}$, normalize the foreground saturation real array variable and the background saturation real array variable respectively and perform subtraction operations to obtain a luminance feature array $V_{sat}$, and normalize the foreground hue real array variable and the background hue real array variable are respectively and perform subtraction operations to obtain a hue feature array $V_{hue}$, and define the real array variable in which $V_{val}$, $V_{sat}$, and $V_{hue}$, are combined into as the feature information.

Preferably, in step S208, set $V_{val}[u]=\max(h_{val,f}[u]/m_f-h_{val,b}[u]/m_b, 0)$, $u=0, \ldots, N_{val}-1$; $V_{sat}[u]=\max(h_{sat,f}[u]/m_f-h_{sat,b}[u]/m_b, 0)$, $u=0, \ldots, N_{sat}-1$; $V_{hue}[u]=\max(h_{hue,f}[u]/m_f-h_{hue,b}[u]/m_b, 0)$, $u=0, \ldots, N_{hue}-1$. To avoid the situation that 0 is as the divisor, when $m_f$ or $m_b$ is less than 1, set it as 1.

Further, the index tree is a k-d tree, and step S104 includes follows:

In the k-d tree which is the index tree containing said feature information $V_1, \ldots, V_S$ corresponding to all sample images, feature information of one or more sample image which has or have the least square Euclidean distance $$dist(V_s, V_0) = \sum_{k=0}^{N_{feat}-1} (V_s[k] - V_0[k])^2$$

from the feature information of the image to be searched ($V_0$) corresponding to the image to be searched, among which, $N_{feat}=N_{val}+N_{sat}+N_{hue}$ represents the total number of elements in the feature array for each image.

It is understood by those skilled in the art that, preferably, said feature information is an array contains $N_{feat}=21$ (among which $N_{val}=5$, $N_{sat}=4$, $N_{hue}=12$) real number, and then defining the square Euclidean distance between feature information $V_s$ corresponding to each sample image $I_s$ and feature information $V_0$ corresponding to the image to be searched based on the formula $$dist(V_s, V_0) = \sum_{k=0}^{N_{feat}-1} (V_s[k] - V_0[k])^2,$$

and use the search algorithm of k-d tree to query the subscript s of one or more sample image(s) that minimize the square Euclidean distance. The $V_s$ corresponding to each subscript s is the feature information corresponding to a sample image in the k-d tree, and $V_0$ is the feature information corresponding to the image to be searched. It is understood by those skilled in the art that the smaller the square Euclidean distance of the feature information, the closer the feature information of the corresponding sample image is to the feature information of the image to be searched, which means that the sample image is similar to the image to be searched.

Further, the k-d tree contains the features of all sample images, but does not contain the features of the image to be searched. Its purpose is to speed up the searching process, and it is not necessary to calculate the squared Euclidean distance from all sample image features and only a small part of the distance may be processed. The more recent sample image feature may be calculated, preferably by using the k-d tree search algorithm in the prior technology, and the smaller the square Euclidean distance, the higher degree of matching between the corresponding sample image and the image to be searched.

Furthermore, according to the subscript s of the closest image among all the sample images, referring the corresponding image content, metadata and other information and finally returning to the client.

The above describes the embodiments of the invention. And it is to be understood that, the invention is not limited to the embodiments mentioned above, those skilled in the art can transform and modify the embodiments within the range of claims, which doesn't affect the essential content of the invention.

The invention claimed is:

1. An image searching method based on feature extraction, which is used to determine at least one sample image similar to the image to be searched, including the following steps:
   a. Performing feature extraction step on all sample images to obtain all corresponding feature information, wherein all sample images are $I_1, I_2, \ldots, I_s$, and the feature information corresponding to all sample images are $V_1, V_2, \ldots, V_s$;
   b. Creating an index tree based on all of said feature information;
   c. Acquiring said feature information corresponding to the image to be searched based on the feature extraction step;
   d. Determining said feature information corresponding to at least one sample image having a minimum distance based on the index tree and said feature information of the image to be searched, which is characterized in that, to perform the feature extraction step on said sample image or each pixel of images to be searched, said step including the following steps:
      i. Determining whether the pixel locates within the outer frame of the main image, if the pixel locates in the outer frame of the main image, then continue with step ii; if the pixel is beyond the outer frame of the main image, then end processing on this pixel, and continue processing the next pixel;
      ii. Calculating the background weight $w_b$ and foreground weight $w_f$ of the pixel;
      iii. Accumulating said $w_f$ and said $w_b$ to variable $m_f$ and $m_b$;
      iv. Getting the screening result of the pixel in the screening information of said sample image or said image to be searched, if the screening result shows that the pixel is reserved, then continue with step v; if the screening result shows that the pixel is screened out, the pixel is not subjected to subsequent processing, and the next pixel will be processed from step i;
      v. Determining whether the red, green, and blue components values of said pixel are all 1, if so, the pixel is not subjected to subsequent processing, and the next pixel will be processed from step i; if any component of the red, green, or blue of the pixel is not 1, then it will continue with step vi;
      vi. Calculating the brightness value Val, the saturation value Sat, and the hue value Hue of said pixel respectively;
      vii. Adding up the brightness value Val, the saturation value Sat, the hue value Hue, background weight $w_b$ and foreground weight $w_f$ to the foreground\background luminance histogram, foreground\background saturation histogram, foreground\background hue histogram, and returning to step i to process the next pixel;
      viii. After performing the process from steps i to vii for all the pixels, next step is to normalize the foreground luminance real array variable and the background luminance real array variable respectively and perform subtraction operations to obtain a luminance feature array $V_{val}$, normalize the foreground saturation real array variable and the background saturation real array variable respectively and perform subtraction operations to obtain a luminance feature array $V_{sat}$, and normalize the foreground hue real array variable and the background hue real array variable are respectively and perform subtraction operations to obtain a hue feature array $V_{hue}$, and define the real array variable in which $V_{val}$, $V_{sat}$, and $V_{hue}$ are combined into as the feature information.

2. The method of claim 1, which is characterized in that, when performing feature extraction on all sample images to obtain all corresponding feature information, performing screening step on the sample images to obtain screening information corresponding to the sample images, and performing feature extraction step on the screening information corresponding to the sample images.

3. The method of claim 2, which is characterized in that, step ii includes following steps:
   When the pixel locates within the inner frame range of the main image, calculating the background weight $w_b$ and foreground weight $w_f$ according to the following formulas "$w_b = (w_{b0})^2$, $w_f = 1 - w_b$", where $$w_{b0} = \min\left(\left|\frac{i}{\max(H-1,1)} - 0.5\right|, \left|\frac{i - i_{1'}}{\max(i_{2'} - i_1' - 1, 1)} - 0.5\right|\right) + \min\left(\left|\frac{j}{\max(W-1,1)} - 0.5\right|, \left|\frac{j - j_{1'}}{\max(j_{2'} - j_1' - 1, 1)} - 0.5\right|\right),$$

where $i_1', i_2'$ represent the two endpoint in the Y-axis of the inner frame of said main image; $j_1', j_2'$ represent the two endpoint in the X-axis of the inner frame of said main image; H represents the height of said image; W represents the width of said image; i, j represent the value of each Y-axis and X-axis coordinate of the pixel; if the pixel is beyond the inner frame range of said main image, then $w_b = 1$, $w_f = 0$.

4. The method of claim 3, which is characterized in that, step iii includes: to set $m_f$ and $m_b$ as two real variables with initial values of 0, and evaluate the pixel in accordance with $m_f := m_f + w_f$, $m_b := m_b + w_b$.

5. The method of claim 4, which is characterized in that, step vi includes:
   Calculating brightness value Val of the pixel according to the formula
   Val=1−(0.299*Red+0.587*Green+0.114*Blue), where Red, Green, Blue represent the red, green, and blue component values, and Red, Green, Blue are all real numbers between 0 and 1;

Calculating saturation value Sat according to the formula:

$Sat=\sqrt{Sat_2}$, where $Sat_2=Sat_1*\min(Sat_1*8,1)$, where $Sat_1=Sat_0*\min(MaxRGB*2,1)$,
$Sat_0=MaxRGB-MinRGB$,
MaxRGB represents the maximum value among Red, Green, Blue,
MinRGB represents minimum value of among Red, Green, Blue;

The hue value of the pixel is calculated according to the following formula:

$$Hue = \begin{cases} 1-\dfrac{Blue-MinRGB}{MaxRGB-MinRGB}, & \text{if } MaxRGB=Red, MinRGB=Green; \\ 1+\dfrac{Green-MinRGB}{MaxRGB-MinRGB}, & \text{if } MaxRGB=Red, MinRGB=Blue; \\ 3-\dfrac{Red-MinRGB}{MaxRGB-MinRGB}, & \text{if } MaxRGB=Green, MinRGB=Blue; \\ 3+\dfrac{Blue-MinRGB}{MaxRGB-MinRGB}, & \text{if } MaxRGB=Green, MinRGB=Red; \\ 5-\dfrac{Green-MinRGB}{MaxRGB-MinRGB}, & \text{if } MaxRGB=Blue, MinRGB=Red; \\ 5+\dfrac{Red-MinRGB}{MaxRGB-MinRGB}, & \text{if } MaxRGB=Blue > Red, MinRGB=Green. \end{cases}$$

6. The method of claim 5, which is characterized in that, step vii includes:

To set $h_{val,f}$ and $h_{val,b}$ as foreground brightness real array variable and background brightness real array variable containing $N_{val}$ elements respectively; $h_{sat,f}$ and $h_{sat,b}$ as foreground saturation real array variable and background saturation real array variable containing $N_{sat}$ elements respectively; $h_{hue,f}$ and $h_{hue,b}$ as foreground hue real array variable and background hue real array variable containing $N_{hue}$ elements respectively;

To set $(N_{val}-1)*Val=u+v$, where u is an integer between 0 and $N_{val}-2$, v is a real number between 0 and 1, then assigning values according to the formulas:

$h_{val,f}[u]:=h_{val,f}[u]+(1-v)*w_f$, $h_{val,f}[u+1]:=h_{val,f}[u+1]v*w_f$, $h_{val,b}[u]:=h_{val,b}[u]+(1-v)*w_b$, $h_{val,b}[u+1]:=h_{val,b}[u+1]+v*w_b$;

To set $(N_{sat}-1)*Sat=u+v$, where u is an integer between 0 and $N_{sat}-2$, v is a real number between 0 and 1, then assigning values according to the formulas:

$h_{sat,f}[u]:=h_{sat,f}[u]+(1-v)*w_f, h_{sat,f}[u+1]:=h_{sat,f}[u+1]+v*w_f$;

$h_{sat,b}[u]:=h_{sat,b}[u]+(1-v)*w_b, h_{sat,b}[u+1]:=h_{sat,b}[u+1]+v*w_b$;

To set $(N_{hue}/6)*Hue=u+v$, where u is an integer between 0 and $N_{hue}-1$, v is a real number between 0 and 1, and $u^+=(u+1) \mod N_{hue}$, then assigning values according to the formulas:

$h_{hue,f}[u]:=h_{hue,f}[u]+(1-v)*Sat*w_f, h_{hue,f}[u^+]:=h_{hue,f}[u^+]+v*Sat*w_f$;

$h_{hue,b}[u]:=h_{hue,b}[u]+(1-v)*Sat*w_b, h_{hue,b}[u^+]:=h_{hue,b}[u^+]+v*Sat*w_b$.

7. The method of claim 6, which is characterized in that, step viii includes:

$V_{val}[u]=\max(h_{val,f}[u]/m_f-h_{val,b}[u]/m_b,0), u=0,\ldots, N_{val}-1$;

$V_{sat}[u]=\max(h_{sat,f}[u]/m_f-h_{sat,b}[u]/m_b,0), u=0,\ldots, N_{sat}-1$;

$V_{hue}[u]=\max(h_{hue,f}[u]/m_f-h_{hue,b}[u]/m_b,0), u=0,\ldots, N_{hue}-1$.

8. The method of claim 1, which is characterized in that, while obtaining the feature information corresponding to the image to be searched based on the feature extraction step, screening the images to be searched to obtain screening information corresponding to the images to be searched and performing feature extraction step on the screening information corresponding to the images to be searched.

9. The method of claim 1, which is characterized in that, step ii includes following steps:

When the pixel locates within the inner frame range of the main image, calculating the background weight $w_b$ and foreground weight $w_f$ according to the following formulas "$w_b=(w_{b0})^2$, $w_f=1-w_b$", where $$w_{b0} = \min\left(\left|\frac{i}{\max(H-1,1)}-0.5\right|,\left|\frac{i-i_{1'}}{\max(i_{2'}-i_1'-1,1)}-0.5\right|\right) + \min\left(\left|\frac{j}{\max(W-1,1)}-0.5\right|,\left|\frac{j-j_{1'}}{\max(j_{2'}-j_1'-1,1)}-0.5\right|\right),$$

where $i_1',i_2'$ represent the two endpoint in the Y-axis of the inner frame of said main image; $j_1',j_2'$ represent the two endpoint in the X-axis of the inner frame of said main image; H represents the height of said image; W represents the width of said image; i,j represent the value of each Y-axis and X-axis coordinate of the pixel; if the pixel is beyond the inner frame range of said main image, then $w_b=1$, $w_f=0$.

10. The method of claim 9, which is characterized in that, step iii includes: to set $m_f$ and $m_b$ as two real variables with initial values of 0, and evaluate the pixel in accordance with $m_f:=m_f+w_f, m_b:=m_b+w_b$.

11. The method of claim 10, which is characterized in that, step vi includes:

Calculating brightness value Val of the pixel according to the formula

Val=1−(0.299*Red+0.587*Green+0.114*Blue), where Red, Green, Blue represent the red, green, and blue component values, and Red, Green, Blue are all real numbers between 0 and 1;

Calculating saturation value Sat according to the formula:

$Sat=\sqrt{Sat_2}$, where $Sat_2=Sat_1*\min(Sat_1*8,1)$, where $Sat_1=Sat_0*\min(MaxRGB*2,1)$, $Sat_0=MaxRGB-MinRGB$, MaxRGB represents the maximum value among Red, Green, Blue, MinRGB represents minimum value of among Red, Green, Blue;

The hue value of the pixel is calculated according to the following formula:

$$\text{Hue} = \begin{cases} 1 - \dfrac{\text{Blue} - \text{Min}RGB}{\text{Max}RGB - \text{Min}RGB}, & \text{if Max}RGB = \text{Red, Min}RGB = \text{Green;} \\ 1 + \dfrac{\text{Green} - \text{Min}RGB}{\text{Max}RGB - \text{Min}RGB}, & \text{if Max}RGB = \text{Red, Min}RGB = \text{Blue;} \\ 3 - \dfrac{\text{Red} - \text{Min}RGB}{\text{Max}RGB - \text{Min}RGB}, & \text{if Max}RGB = \text{Green, Min}RGB = \text{Blue;} \\ 3 + \dfrac{\text{Blue} - \text{Min}RGB}{\text{Max}RGB - \text{Min}RGB}, & \text{if Max}RGB = \text{Green, Min}RGB = \text{Red;} \\ 5 - \dfrac{\text{Green} - \text{Min}RGB}{\text{Max}RGB - \text{Min}RGB}, & \text{if Max}RGB = \text{Blue, Min}RGB = \text{Red;} \\ 5 + \dfrac{\text{Red} - \text{Min}RGB}{\text{Max}RGB - \text{Min}RGB}, & \text{if Max}RGB = \text{Blue} > \text{Red, Min}RGB = \text{Green.} \end{cases}$$

12. The method of claim 6, which is characterized in that, step vii includes:

To set $h_{val,f}$ and $h_{val,b}$ as foreground brightness real array variable and background brightness real array variable containing $N_{val}$ elements respectively; $h_{sat,f}$ and $h_{sat,b}$ as foreground saturation real array variable and background saturation real array variable containing $N_{sat}$ elements respectively; $h_{hue,f}$ and $h_{hue,b}$ as foreground hue real array variable and background hue real array variable containing $N_{hue}$ elements respectively;

To set $(N_{val}-1)*\text{Val}=u+v$, where u is an integer between 0 and $N_{val}-2$, v is a real number between 0 and 1, then assigning values according to the formulas:

$h_{val,f}[u]:=h_{val,f}[u]+(1-v)*w_f;$ $h_{val,f}[u+1]:=h_{val,f}[u+1]v*w_f;$ $h_{val,b}[u]:=h_{val,b}[u]+(1-v)*w_b,$ $h_{val,b}[u+1]:=h_{val,b}[u+1]+v*w_b;$ To set $(N_{sat}-1)*\text{Sat}=u+v$, where u is an integer between 0 and $N_{sat}-2$, v is a real number between 0 and 1, then assigning values according to the formulas:

$h_{sat,f}[u]:=h_{sat,f}[u]+(1-v)*w_f, h_{sat,f}[u+1]:=h_{sat,f}[u+1]+v*w_f;$ $h_{sat,b}[u]:=h_{sat,b}[u]+(1-v)*w_b, h_{sat,b}[u+1]:=h_{sat,b}[u+1]+v*w_b;$ To set $(N_{hue}/6)*\text{Hue}=u+v$, where u is an integer between 0 and $N_{hue}-1$, v is a real number between 0 and 1, and $u^+=(u+1)\bmod N_{hue}$, then assigning values according to the formulas:

$h_{hue,f}[u]:=h_{hue,f}[u]+(1-v)*\text{Sat}*w_f, h_{hue,f}[u^+]:=h_{hue,f}[u^+]+v*\text{Sat}*w_f;$ $h_{hue,b}[u]:=h_{hue,b}[u]+(1-v)*\text{Sat}*w_b, h_{hue,b}[u^+]:=h_{hue,b}[u^+]+v*\text{Sat}*w_b.$ 13. The method of claim 12, which is characterized in that, step viii includes:

$V_{val}[u]=\max(h_{val,f}[u]/m_f-h_{val,b}[u]/m_b,0), u=0,\ldots, N_{val}-1;$ $V_{sat}[u]=\max(h_{sat,f}[u]/m_f-h_{sat,b}[u]/m_b,0), u=0,\ldots, N_{sat}-1;$ $V_{hue}[u]=\max(h_{hue,f}[u]/m_f-h_{hue,b}[u]/m_b,0), u=0,\ldots, N_{hue}-1.$ 14. The method of claim 1, which is characterized in that, before the feature extraction step, performing size compression step on said sample images and/or said images to be searched.

15. The method of claim 1, which characterized in that, said index tree is a k-d tree, and in said k-d tree containing said feature information $V_1, \ldots, V_S$ corresponding to all sample images, searching feature information of one or more sample image which has or have the least square Euclidean distance $$\left(dist(V_s, V_0) = \sum_{k=0}^{N_{feat}-1} (V_s[k] - V_0[k])^2\right)$$

from the feature information $V_0$ corresponding to the image to be searched, among which, $N_{feat}=N_{val}+N_{sat}+N_{hue}$ represents the total number of elements in the feature array for each image.

* * * * *